United States Patent Office 3,349,692
Patented Oct. 31, 1967

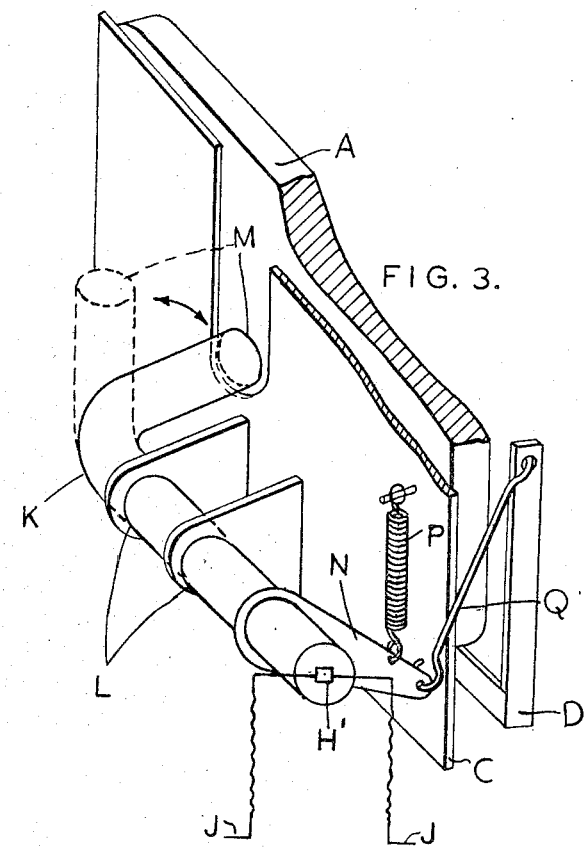
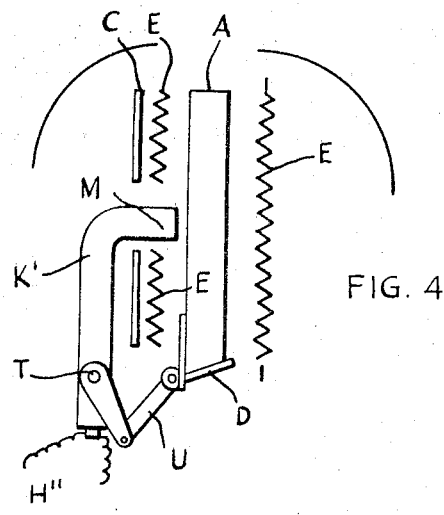

3,349,692
TEMPERATURE-SENSING ARRANGEMENTS FOR HEATING OR COOKING APPLIANCES
John Robert Jones, Sidcup, Kent, England, assignor to Morphy-Richards (Cray) Limited, St. Mary Cray, Kent, England, a company of Great Britain
Filed Aug. 17, 1964, Ser. No. 390,140
Claims priority, application Great Britain, Aug. 22, 1963, 33,254/63
8 Claims. (Cl. 99—331)

ABSTRACT OF THE DISCLOSURE

This specification describes an automatic electric toaster in which heat radiation from the surface of the toast is ducted to a remote thermistor or other heat sensitive electrical element which terminates the toasting operation by means of a transistor trigger circuit when the heat received by the element reaches a threshold level. The duct may be a tube with heat reflecting walls or a rod of heat radiation transmissive material, and it may be linked to the bread carriage so as to be automatically moved away from the surface of the toast to facilitate insertion and removal.

---

This invention relates to temperature-sensitive arrangements for appliances including heating means and it relates especially but not exclusively to electric toasters and other cooking appliances.

It is usual to provide electric toasters with an element such as a bi-metal strip which is deformed in response to the temperature of the toaster and which is arranged to terminate the toasting operation on a time and temperature basis. The toasting process may be terminated by switching off the current supply to the heater, by removing the toast from the vicinity of the heater or otherwise. However, even when the bi-metal strip is located so that it will be close to the surface of the food to be toasted, it is sensitive to a considerable degree to the heater and the ambient temperature within the toaster so that inaccuracy of operation may result. Moreover, a bi-metal strip is usually required to have a relatively large area and mass and therefore has a relatively long thermal lag, which leads to further inaccuracy in the control of the toasting operation.

An object of the present invention is to provide an improved temperature sensing arrangement for an appliance including a heater.

According to the present invention there is provided a cooking appliance for foodstuffs having electrically energised radiant heating means, a support for said foodstuff which can be placed thereon to receive radiation from the heating means to be cooked thereby, an element of low thermal capacity from which is derived an electrical signal which is dependent on its temperature, shielding means preventing heat radiation from said heating means impinging directly on said element, an elongated heat radiation transmissive guide member having radiation reflective walls thereby to tend to retain heat radiation within said guide member, said member being placed with one end facing a portion of the surface of said foodstuff and having at its other end said element at least during cooking of a foodstuff on said support, whereby said element receives heat radiation emitted from said portion of said surface of said foodstuff on said support, and means responsive to said electrical signal for terminating the cooking of said foodstuff.

The sensing element of which an electrical characteristic is sensitive to temperature may comprise a thermistor or other thermo-sensitive resistive element or a thermo-couple and an advantage of the invention is that such an element may be small and therefore may have a short thermal lag and be easily shielded from direct radiation from the heater. Preferably a second similar sensing element is provided, located so as to be sensitive to the ambient temperature in the appliance and arranged to compensate for the effect of ambient temperatures on the first sensing element.

Figure 1:
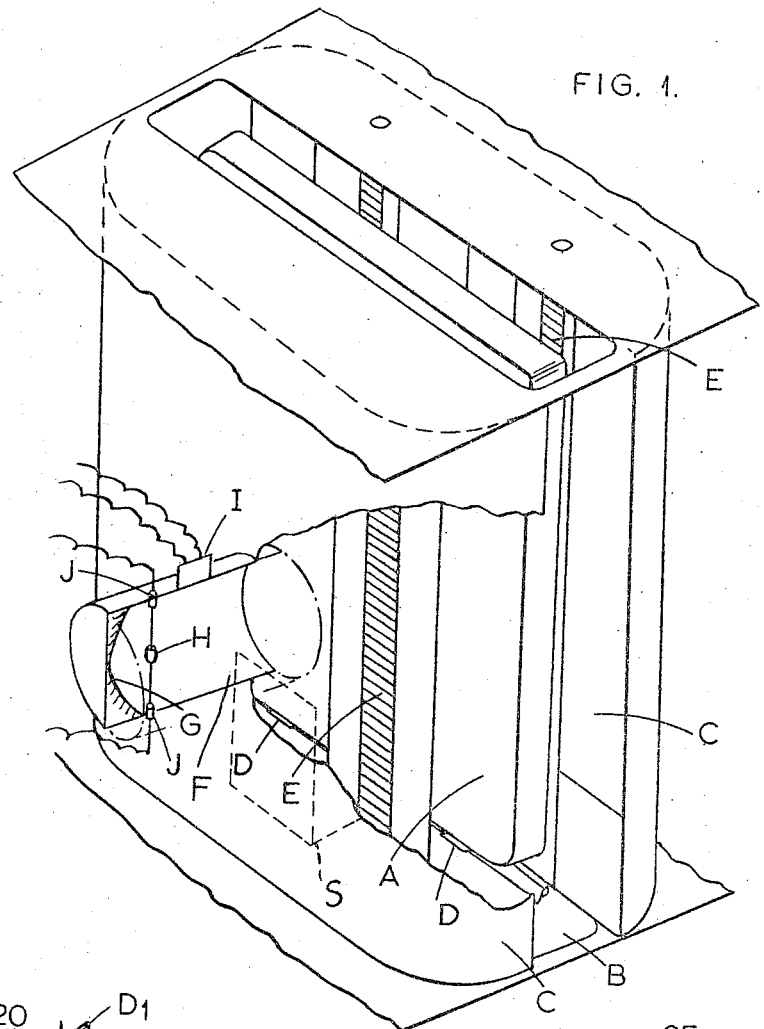
Figure 2:
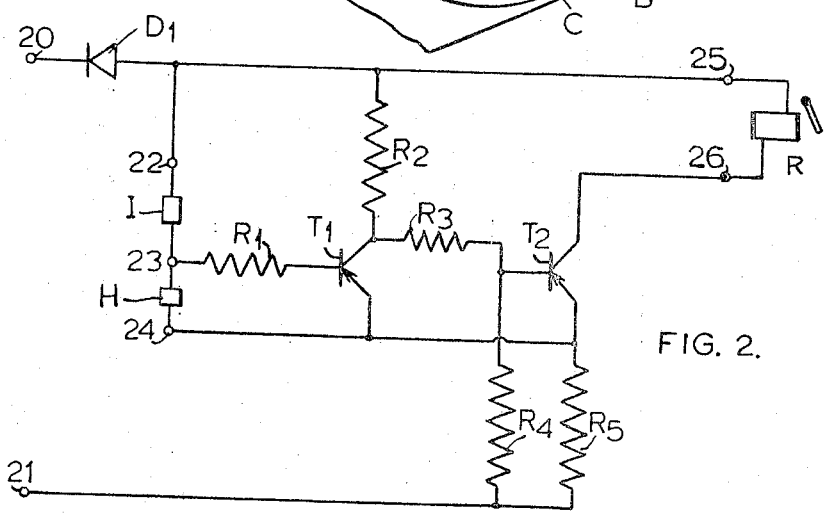

In order that the present invention may be clearly understood and readily carried into effect it will now be described with reference to the accompanying drawings, of which:

FIGURE 1 shows a temperature-sensitive arrangement in accordance with one example of the present invention, together with other parts of an electric toaster, FIGURE 2 shows one example of a circuit arrangement suitable for incorporation in the toaster illustrated in FIGURE 1, and FIGURE 3 shows in diagrammatic form another example of a temperature-sensitive arrangement according to the invention.

The part of the electric toaster shown in FIGURE 1 comprises a toasting chamber contained between two side wall members C which are mounted on a base B. Preferably the inner surface of each member C is polished to provide a reflecting surface and within the toasting chamber are provided electric heating elements E so that when a slice of bread A is located in the toasting chamber, it is disposed between different elements E. The slice A is supported on a moveable bread carriage D. The open end of a tube F, when is closed at its other end, projects from one of the walls C into the toasting chamber. A temperature-sensitive element H is suspended within the tube F near the closed end thereof and the positions of the tube F and element H are such that the element H receives heat radiated from the surface of the slice A being toasted, but direct heat radiation from the heater elements E does not fall on the element H whilst the slice A is in the toasting position. A concave spherical mirror G is mounted at the closed end of the tube F to focus the radiant energy entering the tube F on to the sensing element H. The sensing element H has terminals JJ. A further sensing element I is provided so as to be responsive to the ambient temperature to which the element H is exposed and is arranged to compensate the response of the sensing element H for any changes in the ambient temperature.

The sensing elements H and I may be, for example, thermistors, so that their electrical resistances change as their temperatures change, or they may be provided as the junctions of a thermo-couple or other element of known type having an electrical characteristic changes suitably with changes in temperature. A further alternative for the elements H and I are bunched coils of wire of a material such as nickel.

If the sensing elements H and I are thermistors, they can be connected between the terminals 23, 24 and 22, 23 respectively of the circuit shown in FIGURE 2. This circuit is responsive to variations in resistance of the sensing elements H and I. The resistance change of the element H is compensated by that of the element I in such a way that, when the surface temperature of the slice of bread being toasted reaches a predetermined value, an output signal is provided at the terminals 25, 26 which is sufficient to operate a control device R for terminating the toasting operation. The control device R may be a switch to switch off the current to the heating elements E, or a relay trip coil, motor or other device capable of terminating the toasting operation, for example by raising the bread carriage D thereby removing the bread from the toasting chamber.

If desired, a shutter S, shown dotted in FIGURE 1, linked to the bread carriage D may be arranged to cover the open end of the tube F when a toasting operation is not taking place, thereby to protect the element H from direct heat radiation from the heating elements E.

The circuit shown in FIGURE 2 comprises two transistors denoted by the reference T1 and T2 respectively. These transistors are energised by a half wave rectified supply obtained, via the diode $D_1$, from an alternating current source applied across the terminals 20 and 21. The emitter electrodes of the transistors $T_1$ and $T_2$ are connected together and to one end of the resistor $R_5$. The element H is connected between the terminals 23 and 24 and the element I between 22 and 23. The rising temperature of the bread during toasting raises the temperature of the element H thus causing its resistance to decrease, thus reducing the base/emitter voltage of transistor $T_1$. This reduces the collector current of $T_1$, and thereby increases the base/emitter voltage of transistor $T_2$ which is biased to cut-off in the non-operative condition. This in turn increases the voltage across $R_5$ and hence decreases the collector/emitter voltage and the base/emitter voltage of $T_1$ and because of the regenerative connection of the transistors $T_1$ and $T_2$ the condition is almost immediately reached where $T_1$ is fully cut-off and $T_2$ is fully conducting. Under those conditions the relay or other switching device R which is connected between terminals 25 and 26 operates and the toasting cycle is terminated. When the ambient temperature of the toaster rises, the resistance of element I decreases and this increases the base/emitter voltage thus opposing the effect of element H. The resistors $R_2$, $R_3$ and $R_4$ provide the collector load of $T_1$ and the bias chain for the base of the transistor $T_2$.

The connections of the element H and the compensating element I to the circuit of FIGURE 2 would be interchanged if the resistances of the elements H and I increase with temperature.

FIGURE 3 shows an alternative to the arrangement shown in FIGURE 1 in which the tube F is replaced by a member K in the form of an L-shaped tube or rod of heat transparent material such as quartz which is mounted as indicated diagrammatically in the holes L provided in the structure of the toaster to rotate about one limb of the member K. The temperature sensitive element H' is attached to one end of the member K as shown. The opposite end M of member K is arranged so that in its operative position it is exposed to radiation from the surface of the toast. Heat radiated from the surface of the toast passes up the member K to the element H', being reflected round the corner by reflection from the internal wall of the tube or by internal reflection in the case of a rod. Joined to the member K is an arm N to which is attached a spring P which constrains the member K to the nonoperative position indicated by the dotted lines in the figure. A link Q from the bread carriage is also coupled to the arm N so that when the carriage is depressed to the position which it occupies during a toasting operation the member K is rotated to its operative position as shown by full lines in the figure against the action of the spring P. The rotation of the member K means that the end M may be arranged to be very close to or even in contact with the surface of the bread during a toasting operation but adequate clearance between the bread and the member K is provided whilst the bread is moved into and out of the toasting position. Preferably the member K is screened from direct radiation from the heating elements by the wall C. The remainder of the toaster is omitted from FIGURE 3 for reasons of clarity. A compensating sensing element I may be located elsewhere in the toaster and the elements H and I connected to the circuit shown in FIGURE 2 as described above.

As shown in FIGURE 4, which is a diagrammatic cross-section of a toaster, the member K' may alternatively be mounted for rotation about an axis T perpendicular to both limbs near to the end to which the element H" is attached. In this case the limb of the member K' to which the element would conveniently be arranged to be vertical in the operating position with the end M facing, or in contact with, the centre of the slice A being toasted. Raising the bread carriage would then be coupled by link U to tilt the member K' away from the bread. This arrangement has the advantage that the element H" is located at the bottom of the toaster where it is less subject to heating from the heating elements E.

The compensating element I is placed anywhere in the toaster where the temperature has the correct rate of rise to compensate for the rise in ambient temperature of the main sensing element. This is an advantage in that correct compensation can be obtained if the layout of the appliance is altered in any way.

In the example of the invention shown in FIGURE 1, the compensating element I is placed in direct contact with the outside of tube F.

The invention is not restricted in its application to toasters since it can be applied to other appliances, for example, cooking, grilling or like appliances. Thus, the invention may be employed to control the operation of cookers, ovens or other similar appliances where the condition of the food being heated controls the cooking time. The invention may also be used on electric irons where compensation is sometimes necessary, and if the compensator is omitted, the arrangement can be substituted for the conventional types of thermostat in most appliances.

What I claim is:

1. A cooking appliance for foodstuffs having electrically energised radiant heating means, a support for said foodstuff which can be placed thereon to receive radiation from the heating means to be cooked thereby, an element of low thermal capacity from which is derived an electrical signal which is dependent on its temperature, shielding means preventing heat radiation from said heating means impinging directly on said element, an elongated heat radiation transmissive guide member having radiation reflective walls thereby to tend to retain heat radiation within said guide member, said member being placed with one end facing a portion of the surface of said foodstuff and having at its other end said element at least during cooking of a foodstuff on said support, whereby said element receives heat radiation emitted from said portion of said surface of said foodstuff on said support, and means responsive to said electrical signal for terminating the cooking of said foodstuff.

2. An appliance according to claim 1 wherein said guide member is a tubular member within which said element is disposed.

3. An appliance according to claim 2 comprising a spherical concave mirror disposed at said other end of said member so as to focus radiation received substantially axially along said tubular member onto said element.

4. An appliance according to claim 1 wherein said guide member is L-shaped and of circular cross-section.

5. An appliance according to claim 4 comprising means for displacing said guide member thereby to vary the proximity to said portion of the surface of said foodstuff of said one end.

6. An appliance according to claim 1 wherein said appliance is an electrically operated toasting appliance, said surface being the surface of bread or other food undergoing a toasting operation.

7. An appliance according to claim 1 wherein said terminating means includes a transistor amplifier responsive to said electrical signal to control a cooking operation.

8. An appliance according to claim 7 wherein said transistor amplifier includes a regenerative connection.

(References on following page)

References Cited

UNITED STATES PATENTS

| | | | |
|---|---|---|---|
| 2,375,273 | 5/1945 | Black | 219—510 X |
| 2,597,023 | 5/1952 | Olving | 99—331 X |
| 2,631,523 | 3/1953 | Olving | 99—331 X |
| 2,806,422 | 9/1957 | Koci | 99—331 |
| 2,985,094 | 5/1961 | Shaw et al. | 99—331 |
| 3,068,338 | 12/1962 | Bigler | 219—501 |
| 3,089,407 | 5/1963 | Kinkle | 99—331 |

BILLY J. WILHITE, *Primary Examiner.*